Nov. 8, 1955    L. H. LEONARD, JR    2,722,806
CONTROL ARRANGEMENT FOR ABSORPTION REFRIGERATION SYSTEM
Filed Aug. 7, 1951    3 Sheets-Sheet 1

INVENTOR.
Louis H. Leonard, Jr.
BY Herman Seid
Atty.

Nov. 8, 1955 L. H. LEONARD, JR 2,722,806
CONTROL ARRANGEMENT FOR ABSORPTION REFRIGERATION SYSTEM
Filed Aug. 7, 1951 3 Sheets-Sheet 3

INVENTOR.
Louis H. Leonard, Jr.
BY Herman Seid
Atty.

United States Patent Office 2,722,806
Patented Nov. 8, 1955

2,722,806

CONTROL ARRANGEMENT FOR ABSORPTION REFRIGERATION SYSTEM

Louis H. Leonard, Jr., East Syracuse, N. Y., assignor to Carrier Corporation, Syracuse, N. Y., a corporation of Delaware Application August 7, 1951, Serial No. 240,646

13 Claims. (Cl. 62—5)

This invention relates to an improvement in the control arrangement for an absorption refrigeration machine disclosed in my copending application, Serial No. 240,645, filed August 7, 1951, and is concerned primarily with an absorption refrigeration system employing water as a refrigerant and a solution of lithium bromide and water as an absorbent, the improved control arrangement regulating the capacity of the machine and the concentration of solution leaving the generator without requiring a specific pressure of steam supplied to the generator, the machine being capable of operation with various steam pressures within a wide range.

A satisfactory control system has been devised for an absorption refrigeration system of this type as shown in the copending application of Alexis A. Berestneff, Serial No. 683,390, filed July 13, 1946, now Patent No. 2,446,601, dated August 10, 1948. The control arrangement shown in such copending application is based upon maintenance of desired concentrations of solution leaving the generator and upon variation in flow of solution through the system to regulate the capacity of the system. While this system is adequate in operation, it is complex so that the usual unskilled operator may have difficulty in satisfactorily regulating the machine at start-up. In addition, it is considerably more expensive in initial cost than the present invention even though it is satisfactory in operation.

The chief object of the present invention is to provide an absorption refrigeration system embodying an improved control arrangement which permits effective regulation of the machine over a wide range—from full load to substantially zero load.

An object of the present invention is to provide an absorption refrigeration system which functions effectively over a wide range, the control arrangement being designed to accomplish such operation regardless of the steam pressures employed in the generator.

An object of the present invention is to provide an absorption refrigeration system employing water as a refrigerant and a solution of lithium bromide and water as an absorbent which embodies an economical control arrangement for regulating the capacity of the machine and the concentration of strong solution leaving the generator in a simple, effective manner.

A further object is to provide an absorption refrigeration system in which the capacity is controlled by regulating the ability of the condenser to perform work and in which regulation of the concentration of solution leaving the generator is based on the thermodynamic properties of the solution.

A still further object is to provide an absorption refrigeration system in which the steam input to the generator is balanced with the refrigeration requirements without using a steam valve.

A still further object is to provide an absorption refrigeration machine which is operated at as low a solution concentration as possible to reduce the possibilities of accidental solidification and in which the concentration of solution leaving the generator is only as high as necessary to satisfy the leaving chilled water temperature requirements.

A still further object is to provide an absorption refrigeration machine which is protected against possible solidification of solution in case the external load is completely removed.

A still further object is to provide a control arrangement for an absorption refrigeration system which automatically takes advantage of lower condensing water temperatures by permitting operation of the system at lower solution concentrations.

A still further object is to provide a method of operation of an absorption refrigeration system in which the ability of the condenser to perform work is regulated to provide a desired capacity and in which the concentration of solution leaving the generator is changed as required in accordance with the load imposed upon the system, the desired leaving chilled water temperature and the entering condensing water temperature, while maintaining a substantially constant flow of solution through the system. Other objects of my invention will be readily perceived from the following description.

This invention relates to an absorption refrigeration system which includes an absorber, an evaporator, a generator, and a condenser. The absorber and evaporator preferably are disposed in a shell. Preferably, the generator and condenser are disposed in a second shell which may be placed above the first shell. The absorber and the generator are connected to permit flow of strong solution from the generator to the absorber and flow of weak solution from the absorber to the generator. The condenser serves to condense refrigerant vapor boiled off in the generator, the condensate being returned to the evaporator where it is flash cooled, the flashed vapor passing to the absorber to be absorbed by solution therein. Condensing water is passed through the absorber and the condenser; a valve is disposed in the condensing water line to regulate flow of condensing water through the condenser and hence the ability of the condenser to perform work. A thermostatic control is provided which is actuated in response to the temperature of chilled water leaving the evaporator, such temperature reflecting the load imposed upon the system. This first control regulates passage of compressed air to a second thermostatic control actuated in response to the difference between saturation temperature corresponding to pressure in the generator-condenser shell and the temperature of strong solution leaving the generator-condenser shell. This second control actuates the valve in the condensing water line to move to an opened or closed position to regulate flow of water through the tubes of the condenser. A by-pass is provided about the condenser in order to maintain the flow of condensing water substantially constant through the absorber even though its passage through the tubes of the condenser be retarded or throttled.

This invention further relates to a method of operation of an absorption refrigeration system in which the steps consist in maintaining substantially constant flow of solution through the system, controlling the ability of the condenser to perform work in response to load imposed upon the system, supplying steam to the tubes of the generator, and regulating the concentration of solution leaving the generator by varying the condenser temperature in response to load imposed upon the system.

The attached drawings illustrate a preferred embodiment of my invention in which.

Figure 1:
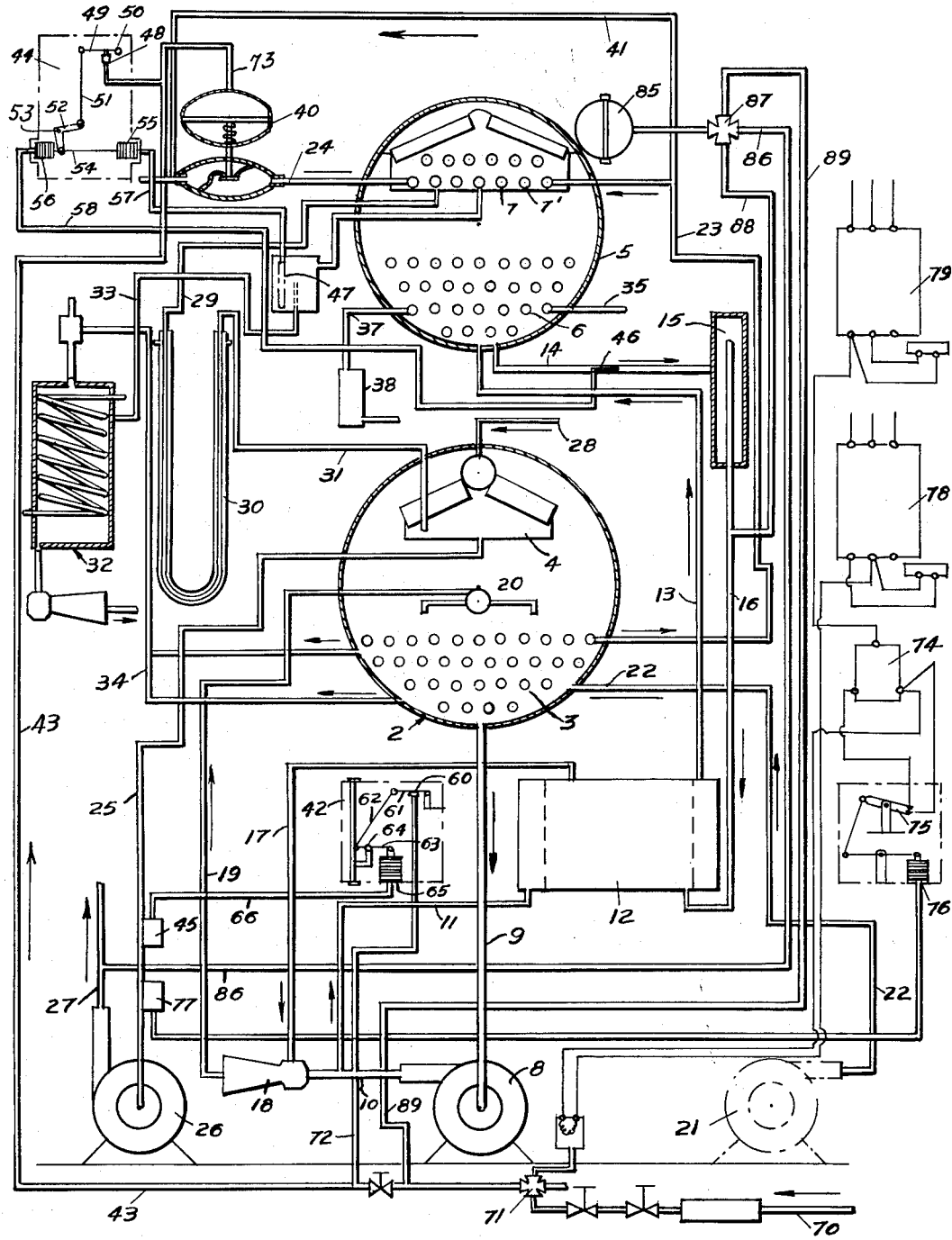
Figure 1 is a diagrammatic view of an absorption refrigeration system embodying the present control arrangement.

Referring to the attached drawings, I have illustrated diagrammatically in Figure 1 an absorption refrigeration system embodying my improved control arrangement. The system comprises a shell 2 containing a plurality of tubes 3 which cooperate with the shell to form an absorber. Placed in shell 2 above absorber 3 is a pan-like member 4 which cooperates with shell 2 to form an evaporator. A second shell 5 preferably is placed above the first shell. Tubes 6 extend in the lower portion of shell 5 and cooperate with shell 5 to form a generator. A plurality of tubes 7 are placed in the upper portion of shell 5 to form a condenser. Tubes 7 cooperate with a pan-like member 7' and with the shell to form a condenser.

A pump 8 withdraws weak solution from absorber 3 through line 9. Pump 8 forwards the weak solution through line 10, line 11, heat exchanger 12, and line 13 to generator 6. Strong solution is withdrawn from generator 6 through line 14 to an overflow arrangement 15 which maintains a desired level of solution in generator 6, line 16, heat exchanger 12, line 17 to an ejector 18 which forwards the strong solution through line 19 to spray arrangement 20 which sprays the strong solution over the tubes of absorber 3. Pump 8 forwards a portion of weak solution through line 10 to ejector 18. Discharge of the weak solution in ejector 18 serves to induce strong solution from line 17 into the ejector and to forward the mixture of strong and weak solutions to the spray arrangement 20. It will be appreciated that pump 8 maintains a substantially constant flow of solution through the system.

Pump 21 supplies condensing water through line 22 to the tubes 3 of the absorber. The condensing water after passage through tubes 3 passes through line 23 to the tubes 7 of the condenser. The condensing water after passage through the tubes of condenser is discharged to a cooling tower or drain through line 24.

Chilled water is withdrawn from the evaporator 4 through line 25 by pump 26 and is circulated to a place of use, which may be the central station of an air conditioning system, through line 27. The chilled water is returned to the evaporator through line 28 and is flash-cooled in the evaporator, the flashed vapor passing to the absorber.

Condensate leaves condenser 7 through line 29, passes through a pre-cooler 30 and is returned to the evaporator through line 31 being flash-cooled in the evaporator, the flashed vapor passing to the absorber 3 as previously described.

A suitable purge arrangement 32 is provided to remove non-condensible gases from condenser 7 and absorber 3. Purge 32 is connected to condenser 7 by line 33. Purge 32 is connected to absorber 3 by line 34.

Steam passes to the tubes of generator 6 through line 35. The present invention does not require control of steam pressure, the present control arrangement functioning satisfactorily over the wide range of steam pressures which may be ordinarily employed in absorption refrigeration machines.

Steam condensate leaves the tubes of generator 6 through line 37, a steam trap 38 being provided in line 37 to assure that only condensate leaves the generator.

A normally closed pneumatic valve 40 is placed in line 24 (Figure 1) to regulate passage of condensing water through the tubes of condenser 7. Valve 40 is actuated as hereinafter described. A by-pass 41 is provided about condenser 7 in order that the flow of condensing water may be maintained substantially constant while varying the volume of condensing water passing through the tubes of condenser 7.

A thermostatic control 42 serves to regulate the pressure of air passing through branch line 43 to a second thermostatic control 44. Thermostatic control 44 in turn regulates the air pressure applied to valve 40.

Thermostatic control 42 is actuated by means of a bulb 45 placed adjacent chilled water line 25. Bulb 45 reflects the temperature of chilled water which in turn indicates the load imposed upon the system.

Control 44 is a differential pressure control and is actuated by the difference in temperature of strong solution leaving the generator as reflected by bulb 46 and saturation temperature corresponding to pressure in shell 5 as reflected by bulb 47. The term "saturation temperature corresponding to condenser pressure" comprehends within its scope the temperature of vapor condensate leaving the condenser. As illustrated, bulb 47 is placed in a casing or housing disposed in line 33 although, if desired, it may be placed in any suitable housing open to shell 5 or in a position to reflect temperature of vapor condensate leaving the condenser. Such housing, if desired, may be cooled or insulated to assure adequate condensation therein.

Control 44 includes a vent 48 adapted to be closed by a flapper 49 pivoted at 50. The flapper is supported by an arm 51 attached to a lever 52 pivoted at 53 and mounted on a rod 54 adapted to be moved horizontally by means of bellows 55 and 56. Bellows 55 forms part of a thermal responsive system including bulb 47, the bellows 55 being connected to bulb 47 by capillary 57, the whole containing the usual type fill to permit increase or decrease in temperature reflected by bulb 47 to vary the pressure imposed upon the bellows. Bellows 56 is placed to oppose movement of rod 54 created by bellows 55. Bellows 56 forms part of a second thermal responsive system including bulb 46, being connected thereto by capillary 58, the second thermal responsive system containing a similar fill to that described.

It is of great value in this invention to select a differential control having a throttling range of about 6°. It will be observed, referring to Figure 3, that a thermostat having such range matches the variations in dew point depression encountered in normal applications where considerable variation in steam pressures are encountered, resulting in variation in temperature of solution leaving the generator.

Thermostat 42 includes a vent 60 adapted to be closed by a flapper 61 which is supported by a lever 62 connected to an arm 63 pivoted at 64. The opposite end of arm 63 is connected to a bellows 65 which forms a portion of the thermal responsive system including bulb 45, being connected to bulb 45 by capillary 66.

Pressure is supplied to the controls through main air line 70, preferably a solenoid valve 71 or relay of suitable design is placed therein as a safety control as hereinafter described. Air pressure passes from line 70 to line 43; thermostat 42 is connected to line 43 by branch line 72; thus pressure in branch line 43 may be regulated by thermostat 42 venting a portion of air therein to the atmosphere in accordance with the temperature of chilled water.

Figure 3:
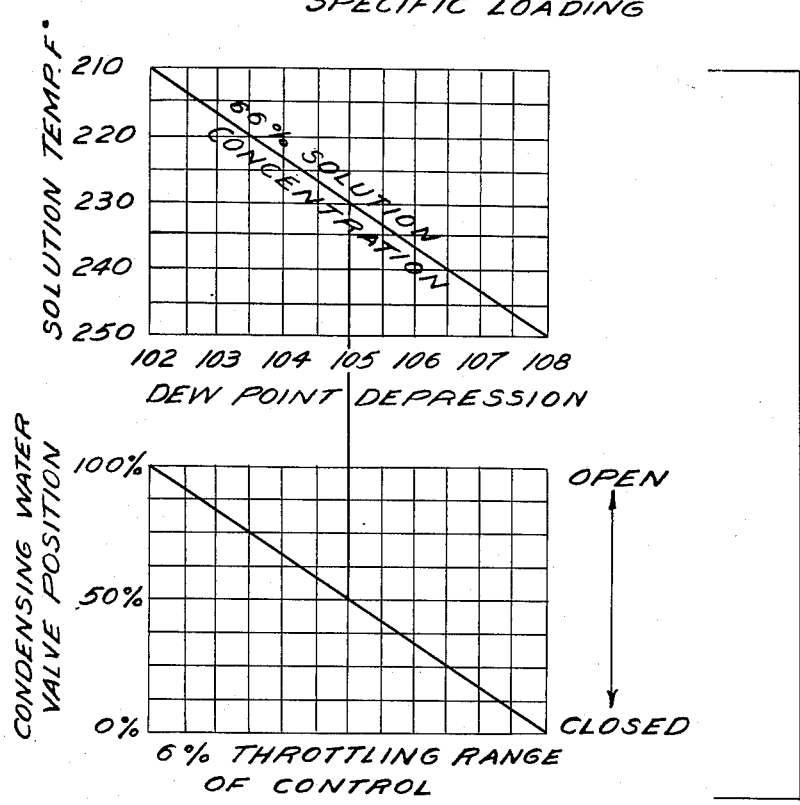
Figure 3 is a graph illustrating the valve setting at full load assuming condenser water at a temperature of 85° F.

Thermostat 44 has air pressure applied therein through line 43 and vents air to atmosphere through vent 48 as determined by the difference in temperature between temperature of strong solution leaving the generator and saturation temperature corresponding to pressure in shell 5 (condenser pressure). As hereinafter described, this differential preferably should not exceed a maximum temperature differential between the condensing temperature and solution temperature as shown in Figure 3, which would employ a solution concentration of 66% concentration. Referring to Figure 3, it will be appreciated that if the solution temperature decreases to, for example, 220° F., then the temperature differential between temperature of solution leaving the generator and condensing temperature will be about 103½° F. The desired 66% solution concentration will be maintained. On the other hand, if the solution temperature increases to, for example, 250° F., then the temperature differential between temperature of solution leaving the generator and condensing temperature will increase to about 108° F.

Branch line 43 is also connected to valve 40 by line 73; thermostats 42 and 44 regulate the air pressure applied to the diaphragm of valve 40.

A rotary switch 74 is provided which is connected to a mercury switch 75. Mercury switch 75 may be actuated by means of a bellows 76 and a bulb 77 placed adjacent the chilled water line. Mercury switch 75 serves, in effect, as a safety control; an increase in temperature of chilled water above a predetermined point opens the switch thereby closing solenoid valve 71 to prevent supply of air to thermostats 42 and 44 and valve 40. The starters 78 and 79 actuate the motors (not shown) of the solution pump 8 and chilled water pump 26. A starter for the condensing water pump 21 is not shown since such pump and motor are generally provided by the installer.

If desired, any suitable arrangement may be provided to permit dilution of the solution upon shut-down of the machine. For example, a dilution tank 85 may be provided connected by line 86 to chilled water pump 26. A three-way valve 87 is placed in such line; valve 87 is also connected by line 88 to strong solution line 16. Preferably valve 87 is pneumatically actuated and is connected by branch line 89 to main air line 70. Thus as shown at start-up, valve 87 is open to permit pump 26 to fill tank 85 with chilled water. When operation of the machine is discontinued for any reason, valve 87 is actuated to permit tank 85 to drain by gravity through line 88 into strong solution line 16, adding refrigerant to the solution and preventing possible crystallization if the machine be permitted to remain shut down for an extended period. This dilution arrangement is shown and claimed in the co-pending application of Alexis A. Berestneff, Serial No. 65,482, filed December 15, 1948. Other suitable dilution arrangements may be employed if desired.

The term "weak solution" is used herein to describe a solution weak in absorbing power. The term "strong solution" is used herein to define a solution strong in absorbing power.

The perferred absorbing solution is a solution of lithium bromide and water. The preferred refrigerant is water. With such solution, the maximum allowable solution concentration leaving the generator for satisfactory operation is 66%. A greater concentration may permit crystallization to occur throughout the system causing solidification in the heat exchanger and in other portions of the system.

Leaving chilled water temperature is determined by the concentration and temperature of solution entering and leaving the absorber. The concentration of solution entering the absorber is determined by the concentration of solution leaving the generator when mixed with the impelling flow from the absorber.

In the present invention, capacity control is obtained by regulating the capacity of the condenser to do work. As previously described, such control is attained by regulating the flow of condensing water through the condenser or, if desired, such control may be achieved by varying the level of condensate in the condenser thereby rendering a portion of the heat exchange surface of the condenser ineffective to condense refrigerant vapor. In this case, of course, it would be necessary to place valve 40 in condensate line 29 rather than in condensing water line 24. Control of solution concentration is based on the thermodynamic properties of the solution.

In dealing with binary saturated solutions, such as lithium bromide and water, there are three variable properties. These properties are vapor pressure, temperature, and concentration. By fixing any two of these three properties, the third is automatically established at some definite point. Hence, by accepting the solution temperature and controlling the condensing temperature, the maximum solution concentration is automatically determined.

I have found that a maximum allowable solution concentration leaving the generator is about 66% at 100% capacity; at such full load, assuming 230° F. solution temperature, the difference between the temperature of solution leaving the generator and the condensing temperature is about 105° F. As explained above, the temperature differential will vary at full load depending upon solution temperature. This specific temperature difference applies to the solution temperature recited above which is normally encountered with an absorption refrigeration machine employing a solution of lithium bromide and water as the absorber and water as the refrigerant. The differential in this instance is maintained by accepting the solution temperature leaving the generator which, in turn, is dependent upon a temperature corresponding to the pressure of steam entering the generator, heat transfer, etc., and regulating the condensing temperature so that under all circumstances during operation, the temperature difference between condensing temperature and temperature of solution leaving the generator is not more than 105° F. assuming 230° F. solution temperature. Control 44 prevents the temperature differential becoming more than 105° F. under these conditions of operation. It will be understood that the above conditions apply only to this specific solution temperature and that the differential will vary depending upon changes in entering steam pressure at full load.

With the design of the present machine, solution concentrations over 66% are not encountered frequently if normal entering condensing water temperatures, say about 85° F., exist during operation. The control arrangement prevents the solution from solidifying if a sudden drop in condensing water temperature occurs or if excessive flow of condensing water to the condenser occurs due to improper adjustment when the machine is first placed in operation.

Considering the operation of the device at full load (100% capacity), it will be appreciated that the present invention is not dependent upon any specific pressure of steam supplied to the generator; any steam pressure available may be employed. Since, generally speaking, the specific steam pressure in any application is known, the temperature is likewise known.

At full load, the temperature of solution leaving the generator is determined by steam pressure existing at that particular time. At full load, the temperature differential between the temperature of solution leaving the generator and the condensing temperature employing a solution of lithium bromide and water as the absorber, water as the refrigerant in a 66% concentration, and assuming temperature of condensing water as 85° F., and temperature of solution leaving the generator as 230° F., is 105° F. Assuming temperature of solution leaving the generator is 220° F., other conditions remaining as described, then the temperature differential will be slightly less than 104° F. Assuming temperature of solution leaving the generator is 240° F., other conditions remaining as described, then the temperature differential will fall between 106° F. and 107° F.

If the temperature of condensing water is low, solution concentration of less than 66% is satisfactory if it produces the necessary capacity because the absorber may operate at a much lower solution concentration if the temperature of the condensing water is low. That is, the same mean effective temperature difference required to transfer the same amount of heat may be obtained with much lower solution concentrations. Under these conditions, when the machine is operating at less than 66% solution concentration, the differential control is not functioning and the machine is controlled by thermostat 42.

Low entering condensing water temperatures will permit the machine to operate at lower solution concentrations for the same leaving chilled water temperature. In other words, the machine takes advantage of working at lowest possible solution concentrations to prevent accidental solidification. The control arrangement is designed to maintain a maximum solution concentration which assures efficient operation of the machine and eliminates any possibility of crystallization of solution throughout the system.

The control valve 40 and the controls 42, 44 may be set as illustrated in Figure 3. It will be noted that a 66% solution concentration at full load, assuming 85° F. temperature of condensing water, the temperature of solution leaving the generator is 230° F. so that if the desired temperature differential (dew point depression) be maintained, condensing temperature is 125° F. and the valve is 50% open. The inherent properties of the solution are such, assuming a solution concentration of 66% as shown in Figure 3, that if solution temperatures are varied from 210° F. to 250° F., the corresponding temperature differential required to maintain the desired 66% solution concentration, varies from 102° F. to 108° F. The recited solution temperatures cover the extremes of conditions normally encountered. Considering this variation in range of dew point depression of 6°, any suitable differential thermostat may be employed having a throttling range of 6°. As shown in Figure 3, this 6° throttling range is required to move the valve from a closed to fully open position.

The control arrangement described automatically provides the desired solution concentration depending upon the load imposed upon the machine during operation.

Compressed air pressure is applied to thermostats 42 and 44 through main line 70 and branch lines 72 and 43. Thermostat 42 serves to vary the pressure in line 43 in accordance with variation in temperature of chilled water leaving the evaporator which reflects the load upon the system. Thermostat 44, in response to the difference in temperature between temperature of solution leaving the generator and saturation temperature corresponding to pressure in shell 5, varies the air pressure imposed upon valve 40 which regulates passage of condensing water through the tubes of condenser 7.

At full load, both controls 42 and 44 are effective to regulate valve 40. Valve 40 is regulated to maintain the desired temperature differential depending upon the entering water and condensing water temperatures, chilled water temperature desired, etc. Slight changes in entering chilled water temperature and the difference between saturation temperature corresponding to pressure in shell 5 and temperature of solution leaving the generator are reflected by bulbs 45, 46 so that the controls function to move valve 40 toward open or closed positions to maintain the desired differential.

A control arrangement for an absorption refrigeration system should maintain the amount of water (refrigerant) absorbed in the absorber in exact balance with the amount of water (refrigerant) boiled off in the generator. If more refrigerant is boiled off in the generator than is absorbed in the absorber, solidification of solution will result. If less refrigerant is boiled off in the generator than is absorbed in the absorber, the absorbent solution will become more dilute and the machine will lose capacity until an equilibrium point is reached. At full load, the balance between the amounts of refrigerant absorbed in the absorber and boiled off in the generator is maintained by setting the controls to regulate the condensing temperature and by the basic design of the machine.

At partial loads, chilled water temperature decreases, which cause the condensing water flow to the condenser to be throttled which limits the ability of the condenser to perform work. The condenser in turn limits the ability of the generator to perform work and the balance between refrigerant absorbed in the absorber and refrigerant boiled off in the generator is upset when the ability of the generator to perform work it limited, less refrigerant is boiled off and the solution is more dilute, in turn limiting the ability of the absorber to perform work so that the overall capacity of the machine is decreased. In other words, by limiting the work performed by the condenser, the work performed in the generator is reduced which reduces the ability of the absorber to perform work in turn reducing the ability of the evaporator to perform work.

Control of the system is based upon the ability of the condenser to perform work and the fact that the condenser is indirectly able to control the amount of work done in the generator. Since the solution flow throughout the system is constant, capacity regulation is obtained by change in concentration of solution leaving the generator. Since the concentration of solution leaving the generator decreases with a decrease in load, it will be appreciated that the maximum concentration of 66% is required only when the machine is operated at full load. At zero load, there is no change in solution concentration leaving the generator and leaving the absorber (or entering the generator).

Figure 2:
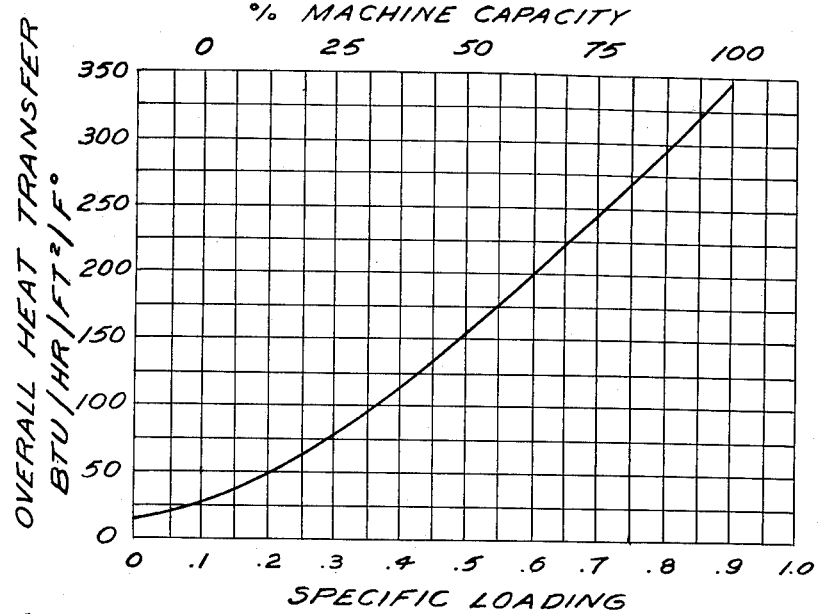
Figure 2 is a graph illustrating the manner in which the generator overall heat transfer changes in accordance with the load imposed upon this system.

Heat input to the generator derived by the condensing steam, is determined by the mean effective temperature difference in the generator, the generator overall heat transfer, and the amount of generator heat transfer surface. At partial load, solution temperature decreases and the mean effective temperature difference between the solution and steam is increased. Even though the mean effective temperature difference in the generator increases at partial loads, the overall heat transfer decreases in a much greater proportion; thus the generator input is kept in balance with the load requirements at partial load. The change in specific loading in the generator affects the generator heat transfer as will be observed by referring to Figure 2. It will be noted that as the specific loading of the generator decreases, the overall heat transfer likewise decreases and the capacity of the machine is reduced. The term "specific loading" may be defined as the amount of heat transferred through a unit of heat transfer surface.

Considering operation of the system under partial load, temperature of chilled water leaving the evaporator reduces below the control point of thermostat 44 and causes a proportionate decrease in pressure in branch line 43 since thermostat 42 is moved to an air venting position. Under normal conditions at partial load, thermostat 44 is ineffective and valve 40 may be deemed to be regulated directly by thermostat 42.

As temperature of chilled water decreases, thermostat 42 regulates valve 40 to decrease the volume of condensing water passing through the tubes of condenser 7. Since the volume of condensing water passing through the tubes of condenser 7 is decreased, the condenser is able to do less work, thus the condensing temperature increases. The increase in condensing temperature causes a proportionate increase in pressure in shell 5. A decrease in the work performed by the generator is caused by the decrease in the ability of the condenser to perform work so that the specific loading on the generator is reduced, resulting in the overall heat transfer being proportionately reduced with less refrigerant being boiled off. Since less refrigerant is removed from the solution in the generator, the concentration of solution leaving the generator is reduced. The generator is able to do less work so the temperature of solution leaving the generator is reduced.

At partial load, as the condensing temperature increases, solution temperature decreases, concentration of solution leaving the generator decreases, and the temperature difference between the condensing temperature and the solution temperature leaving the generator also decreases at partial load. Since the condenser is able to do less work, the temperature differential between solution leaving the generator and the condenser temperature is less than the temperature required to provide 66% solution concentration. If, for example, an unexpected increase in steam pressure or a drop in entering water temperature occurs, this temperature difference will increase to a point where thermostat 44 becomes effective automatically to throttle valve 40 to reduce still more the amount of condensing water passing through condenser 7.

Concentration of solution leaving the generator decreases on partial load operation since the condensing temperature increases due to the fact that less condensing water is passing through the tubes of the condenser.

As an illustration, assume for example that at full load the temperature of solution leaving the generator is 230° F.; the differential is 105° F. so that the condensing temperature is 125° F. Assume steam temperature is 250° F. so that the mean effective temperature difference is 20° F. The solution concentration leaving the generator is 66%. Temperature of chilled water leaving the evaporator is 45° F. Suppose the load drops to 50% capacity. Such decrease in load is reflected by the temperature of chilled water leaving the evaporator which decreases to approximately 43° F. Immediately, thermostat 42 is actuated to move valve 40 toward a closed position, throttling flow of condensing water through the tubes of condenser 7. Since less condensing water passes through condenser 7, the condenser is able to do less work and the condensing temperature rises to about 130° F. Rise in condensing temperature increases the pressure in shell 5. The decrease in the ability of the condenser to perform work reduces the ability of the generator to perform work resulting in the overall heat transfer being reduced with less refrigerant being boiled off. Since less refrigerant is boiled off, the concentration of solution leaving the generator and the temperature of solution leaving the generator decreases thus changing the capacity of the machine to balance the change in load imposed thereon.

It will be appreciated the capacity of the machine may be reduced to substantially zero load. The generator heat transfer can be reduced only a certain amount which never approaches zero. By keeping a constant solution flow to the generator under all load conditions, the generator still must do considerable work even at zero refrigeration load, for with constant solution flow to the generator, the amount of heat required for pre-heating the solution remains almost constant throughout the entire range of capacity. Thus the generator heat transfer does not have to reduce to zero for zero load operation.

Figure 4:
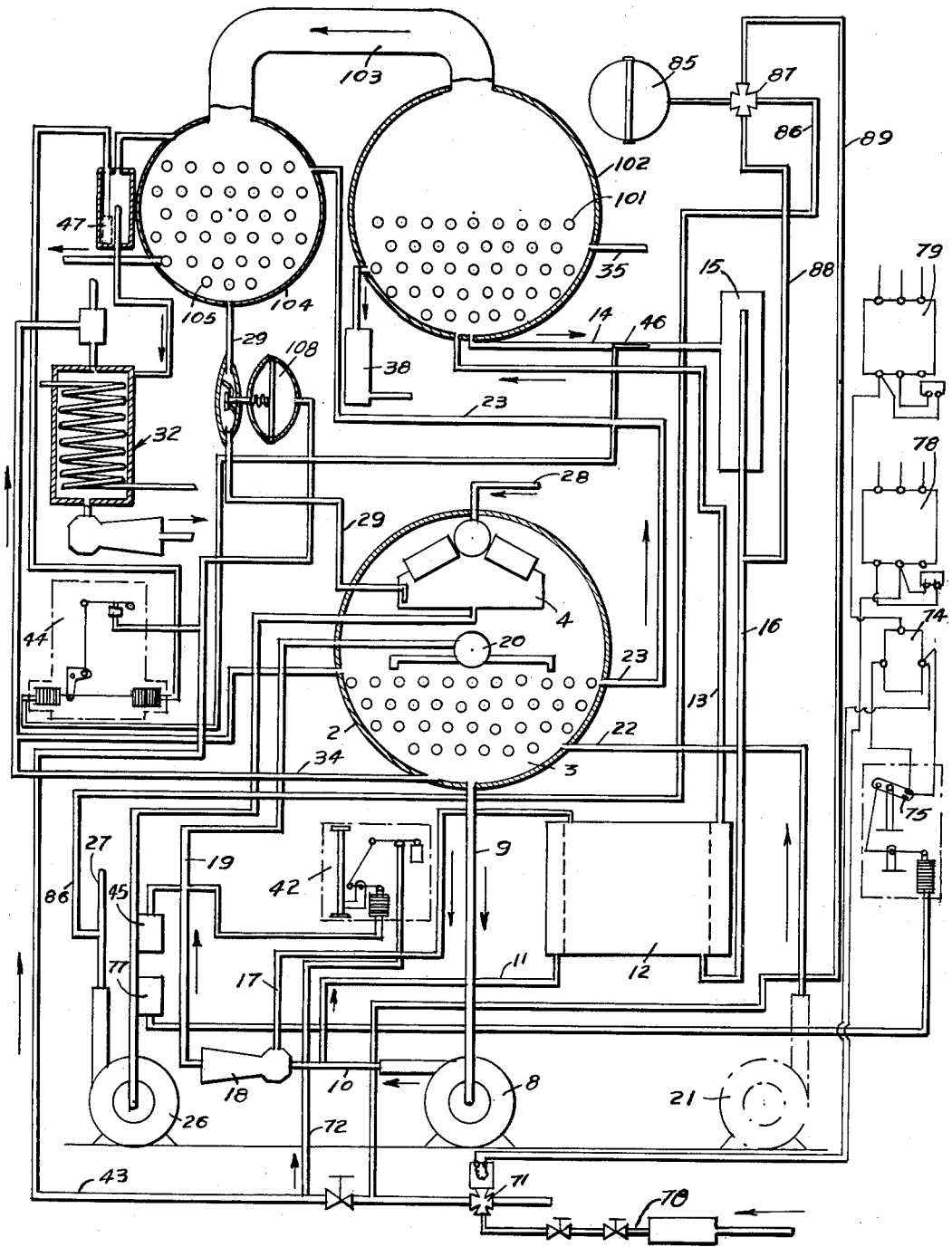
Figure 4 is a view, similar to Figure 1, of a modification.

In Figure 4, I have illustrated a modification of the invention in which the absorption refrigeration system is controlled by varying the level of condensate in the condenser rather than by varying the flow of condensing water through the tubes of the condenser. As shown in Figure 4, the generator 101 is placed in a shell 102 which is connected by a duct 103 to a shell 104 in which is placed the condenser 105. Condensate line 29 connects the bottom of shell 104 with evaporator 4. No loop 30 is necessary in this construction since the control valve acts as a vapor seal between the two shells. The submerged portion of the condenser provides sufficient subcooling. A valve 108 similar to the valve is placed in line 29. In the structure shown in Figure 3, the flow of condensing water through the tubes of the condenser is constant.

As discussed above, the system is controlled by the level of condensate maintained in the condenser. It will be appreciated condensate renders ineffective the heat exchange surface of the condenser submerged therein for condensing purposes. The submerged surface of the condenser serves to precool the condensate before it is returned to the evaporator, substantially increasing the machine performance. As the level of condensate in the condenser varies, more or less heat exchange surface is rendered ineffective thereby varying the capacity of the condenser. The level of condensate in the condenser is varied by means of valve 108 which throttles flow of condensate through line 29 to the evaporator 4. In other respects, the control system is the same as previously described in connection with Figure 1.

It will be appreciated this three-shell structure affords a more economical structure since it is not necessary to design the condenser to compensate for the extreme changes in temperature, etc. to which it is subject when the condenser and generator are placed in the same shell.

The present invention permits flow of solution through the system to be maintained substantially constant while varying the concentration of the solution in accordance with changes in condensing temperature. It is essential in the present invention that the maximum solution concentration should not exceed 66% under any conditions of entering steam pressure or condensing water temperature. A greater concentration increases the danger of crystallization of solution throughout the system. The present invention accepts any available steam pressure and temperature of solution leaving the generator and permits variation in condensing temperature to regulate capacity and concentration of solution leaving the generator.

The present invention provides a highly effective control arrangement for an absorption refrigeration machine employing a solution of lithium bromide and water as an absorber and water as the refrigerant. While I have explained that the maximum solution concentration is 66% under full load conditions, it will be understood that if other saline solutions are employed, this concentration may vary depending upon the specific absorbing solution employed.

In the control arrangement described and claimed in my copending application above referred to, it is necessary that the machine be designed to employ steam at a fixed pressure. The present control arrangement eliminates this disadvantage and permits the machine to be employed using any available steam within a wide range of pressures. It provides this advantage by regulating in response to the difference in temperature of solution leaving the generator and saturation temperature corresponding to pressure in the condenser-generator shell (condensing pressure).

The present invention provides a control system which permits satisfactory control of an absorption refrigeration machine during operation at full and partial loads. The control arrangement provided permits the machine to be operated over a wider range of capacity than heretofore available. The present control arrangement permits operation from 100% capacity to substantially zero capacity.

The control arrangement greatly reduces the time required to install and place the machine in satisfactory operation. It is not necessary to employ controls with built-in reset features, thereby considerably reducing the expense involved in the control arrangement. In my invention, solution properties compensate for inherent throttling range of inexpensive controls.

While I have described a preferred embodiment of my invention it will be understood my invention is not limited thereto since it may be otherwise embodied within the scope of the following claims.

I claim:

1. In an absorption refrigeration system, the combination of a generator, a condenser, an evaporator, and an absorber placed in a closed circuit, the circuit containing a saline solution as an absorbent and water as a refrigerant, means for maintaining substantially constant flow of solution through the system, and means for regulating the concentration of solution leaving the generator in response to the difference in temperature between temperature of solution leaving hte generator and saturation temperature corresponding to condenser pressure without interference with solution flow.

2. In an absorption refrigeration system, the combination of a generator, a condenser, an evaporator and an absorber placed in a closed circuit, the circuit containing a saline solution as an absorbent and water as a refrigerant, means for maintaining substantially constant flow of solution through the system, means for maintaining a desired maximum concentration of solution leaving the generator at full load responsive to the difference in temperature between temperature of solution leaving the generator and saturation temperature corresponding to condenser pressure, and means for varying the concentration of solution leaving the generator at partial load in response to a change in temperature of water leaving the evaporator without interference with solution flow in the system.

3. In an absorption refrigeration system, the combination of a generator, a condenser, an evaporator and an absorber placed in a closed circuit, the circuit containing a saline solution as an absorbent and water as a refrigerant, means for maintaining substantially constant flow of solution through the system, a valve for regulating flow of condensing medium through the condenser, a thermostatic control responsive to variation in the difference in temperature between temperature of solution leaving the generator and saturation temperature corresponding to condenser pressure for regulating said valve, and a thermostatic control responsive to variation in load imposed upon the system to regulate said valve.

4. In an absorption refrigeration system, the combination of a generator, a condenser, an evaporator and an absorber placed in a closed circuit, the circuit containing a saline solution as an absorbent and water as refrigerant, means for maintaining substantially constant flow of solution through the system, a pneumatic valve for regulating flow of condensing medium through the condenser, a source of supply of compressed air connected to the valve, a thermostatic control connected to the compressed air supply for regulating said valve to maintain a temperature differential between temperature of solution leaving the generator and condenser temperature not greater than 105° F. at full load employing a 66% solution concentration, and a second thermostatic control connected to the compressed air supply for varying the air pressure supplied to the first control and the valve in response to variation in load imposed upon the system.

5. An absorption refrigeration system according to claim 4 in which the first thermostatic control is responsive to variation in the difference in temperature between the temperature of solution leaving the generator and saturation temperature corresponding to condenser pressure and the second control is responsive to temperature of water leaving the evaporator.

6. An absorption refrigeration system according to claim 4 in which a safety control is provided to prevent passage of compressed air to the controls and the valve in response to a variation in temperature of water leaving the evaporator beyond a predetermined range thereby discontinuing operation of the system.

7. An absorption refrigeration system, the combination of a shell, an element in said shell cooperating therewith to form an absorber, a second element in said shell disposed above the first element cooperating with the shell to form an evaporator, a second shell, a member in said second shell cooperating therewith to form a generator, a second member in said second shell placed above the first member and cooperating with the shell to form a condenser, the generator, condenser, absorber and evaporator being placed in a closed circuit, the circuit containing a saline solution as an absorbent and water as a refrigerant, means for maintaining substantially constant flow of solution through the system, a valve for regulating flow of condensing water through the condenser, a thermostatic control for regulating said valve to maintain a temperature differential between temperature of solution leaving the generator and condenser temperature not greater than 105° F. at full load employing a 66% solution concentration, and a thermosatic control responsive to variation in load imposed upon the system to regulate said valve.

8. An absorption refrigeration system according to claim 7 in which the first thermostatic control is responsive to variation in the difference in temperature between temperature of solution leaving the generator and saturation temperature corresponding to condenser pressure.

9. An absorption refrigeration system according to claim 8 in which a safety control is provided to discontinue operation of the system in response to a variation in temperature of water leaving the evaporator beyond a predetermined range.

10. In an absorption refrigeration system, the combination of a shell, an element in said shell corresponding therewith to form an absorber, a second element in said shell cooperating with the shell to form an evaporator, a second shell, a member in the second shell cooperating therewith to form a generator, a third shell, a member in said third shell cooperating therewith to form a condenser, the generator, condenser, evaporator and absorber being placed in a closed circuit, the circuit containing a saline solution as an absorbent and water as a refrigerant, a condensate line connecting the condenser with the evaporator, a valve in the condensate line to regulate passage of condensate therethrough, variation in flow of condensate through said line varying the level of condensate in the condenser shell thereby rendering a portion of the condenser heat exchange surface ineffective, a thermostatic control for maintaining a desired pressure differential between temperature of solution leaving the generator and condenser temperature by regulating said valve, and a second thermostatic control for regulating said valve responsive to variation in temperature of water leaving the generator.

11. An absorption refrigeration system according to claim 10 in which the first thermostatic control is responsive to variation in the difference in temperature between temperature of solution leaving the generator and saturation temperature corresponding to condenser pressure.

12. In the operation of an absorption refrigeration system containing an absorber, an evaporator, a generator and a condenser placed in a closed circuit and employing a saline solution as an absorbent and water as a refrigerant, the steps which consist in maintaining a substantially constant flow of solution through the system automatically maintaining at full load a temperature difference not greater than 105° F. between condensing temperature and temperature of solution leaving the generator responsive to temperature differential between temperature of solution leaving the generator and saturation temperature corresponding to condenser pressure, and, at partial load, decreasing the difference in temperature between condensing temperature and temperature of solution leaving the generator to regulate the capacity of the system in accordance with the load imposed thereon.

13. In an absorption refrigeration system, the combination of an absorber, an evaporator, a generator and a condenser placed in a closed circuit, the circuit containing a saline solution as an absorbent and water as a refrigerant, means for maintaining substantially constant flow of solution through the system, a valve for regulating flow of condensing medium through the condenser, a thermostatic control for actuating said valve to provide a desired temperature differential between temperature of solution leaving the generator and condenser temperature, the throttling range of said valve being selected in accordance with the range of dew point depression encountered under normal conditions of operation at full load with 66% concentration of solution leaving the generator and with temperature of solution leaving the generation within the range of 210°–250° F., and a second thermostatic control for actuating the valve in response to variation in load imposed upon the system.

References Cited in the file of this patent

UNITED STATES PATENTS

| | | |
|---|---|---|
| 2,298,924 | Bichowsky | Oct. 13, 1942 |
| 2,378,177 | Bichowsky | June 12, 1945 |